(12) United States Patent
Sasaki (10) Patent No.: US 6,337,950 B2
(45) Date of Patent: Jan. 8, 2002

(54) PROCESSING LIQUID SPREADING DEVICE FOR INSTANT FILM UNIT

(75) Inventor: Hidemi Sasaki, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/757,574

(22) Filed: Jan. 11, 2001

(30) Foreign Application Priority Data

Jan. 20, 2000 (JP) ............................................ 12-012000

(51) Int. Cl.⁷ ............................................... G03B 17/50
(52) U.S. Cl. ......................................................... 396/33
(58) Field of Search ..................................... 396/32–40

(56) References Cited

U.S. PATENT DOCUMENTS 4,051,492 A * 9/1977 Laskin et al. .................. 396/40

FOREIGN PATENT DOCUMENTS

JP 2-232639 9/1990 ........... G03B/17/52

* cited by examiner

*Primary Examiner*—D. Rutledge
(74) *Attorney, Agent, or Firm*—Sughrue Mion, PLLC

(57) ABSTRACT

A processing liquid spreading device for instant film unit comprising: a pair of processing liquid spreading rollers; a motor for driving the pair of processing liquid spreading rollers; and a reduction gear to transmit a rotation of an output shaft of the motor to the pair of processing liquid spreading rollers while reducing a rotational speed of the output shaft, wherein the reduction gear includes a driving gear and a driven irregular formed gear which rotates one turn or less to complete a film unit transportation cycle from starting to advance the film unit by picking the trailing end thereof to making the trailing end emerge from the pair of rollers and has configuration that a distance between the rotational axis and the periphery varies along the periphery so that the torque of the output shaft can vary as the film unit is transported.

12 Claims, 14 Drawing Sheets

PROCESSING LIQUID SPREADING DEVICE FOR INSTANT FILM UNIT

FIELD OF THE INVENTION

The invention relates to a processing liquid spreading device, particular saving electric power consumed thereby.

BACKGROUND OF THE INVENTION

A camera or a printer using mono-sheet type instant film unit, or non-peeling apart type self-developing film unit (hereinafter referred to as simply film unit) have a processing liquid spreading device for spreading a processing liquid over a photosensitive layer of the unit while transporting the film unit out of the camera or the printer after exposure of the film unit. After being exposed, the film unit is picked in the trailing end and moved to a bite of a pair of pressure-applying rollers of the processing liquid spreading device by well-known picking device having a claw, then discharged out of the camera or the printer by the rotating pair of pressure-applying rollers while spreading the processing liquid. The pair of pressure-applying rollers and the picking device are driven by a common electric motor via a plurality of gears and cams.

The film unit comprises a rupturable pod containing a processing liquid in the leading end portion and a trap member to catch an excess processing liquid after being spread by the pair of pressure-applying rollers. Thus a thickness of film unit changes along its moving direction. Consequently, the load applied to the motor increases, which requires a larger torque when the thicker portions of the film unit such as the rupturable pod portion or the trap member portion pass through a bite of the pair of pressure-applying rollers in addition to starting to rotate the motor. A conventional instant camera or printer using the film unit has to have a battery and a motor capable of generating a large power, capacity and torque to cope with the increase of load.

The battery having a large power and capacity also requires larger size, which causes a size of the camera or printer to increase and makes them inconvenient to carry and handle. On the contrary, using a smaller size battery decreases the maximum number of pictures to be taken and influence the quality of pictures because of insufficient ability to spread the processing liquid.

Japanese Laid-open Patent 232639/90 (tokkai-hei 02-232639) shows the technology to solve the problem above mentioned, which includes a capacitor charged by multiplying the voltage of the battery and a switching control circuit to generate a switching signal at the time a load applied to a pair of pressure-applying rollers increases to supply power from the capacitor to the motor to increase its torque. However, such technology needs an additional capacitor, multiplying voltage circuit and switching control circuit, which increase the cost of the camera. Moreover, the motor also needs the ability to cope with high voltage supplied from the capacitor, which also increases the cost. Furthermore, it is not so effective in terms of overall power saving of battery, even though it is effective in terms of decreasing a peak current the battery has to supply.

SUMMARY OF THE INVENTION

An object of the invention is to provide a processing liquid spreading device for an instant film unit which can save the power of a battery without increasing the cost.

Another object of the invention is to provide a camera or a printer using the film unit capable of taking more pictures without using a large capacity battery which leads to a larger size camera or printer.

In the invention, a processing liquid spreading device for instant film unit comprises a pair of processing liquid spreading rollers; a motor for driving the pair of processing liquid spreading rollers; and a reduction gear to transmit a rotation of an output shaft of the motor to the pair of processing liquid spreading rollers while reducing a rotational speed of an output shaft of the reduction gear, wherein a reduction ratio of the reduction gear varies in sequence as the film unit advances so that a load fluctuation applied to the motor can be reduced. The reduction gear includes a driven gear which rotates one turn or less to complete a transportation cycle of the film unit and a driving gear to transmit the rotation of an output shaft of the motor to the driven gear. As the driving gear, an irregular formed gear is used and the driving gear is movable and biased in a direction toward a rotational axis of the driven gear to mesh therewith.

The irregular formed gear has a configuration that a distance between a periphery and a rotational axis thereof varies corresponding to a thickness variation in the film unit in the advancing direction. For example, the irregular formed gear has a first sector portion and a second sector portion corresponding respectively to a leading end portion and trailing end portion of the film unit, the first sector portion includes the largest distance between the periphery and the rotational axis and the second sector portion includes the second largest distance.

In some embodiments, the driving gear is moved along a direction toward the rotational axis of the driven gear by a cam integrally rotating with the driven gear so that the driving gear can be meshed therewith. As the cam, a cam slot is used which is formed on a side of gear which rotates integrally with the driven gear. Another type of the cam is a cam plate which rotates integrally with the driven gear and the driving gear is biased by using a sun and planet gear mechanism in a direction toward a rotational axis of the driven gear to mesh therewith.

A sun and planet gear mechanism can be used instead of biasing spring to keep the driving gear meshed with the driven gear. A worm wheel and worm can be used as the reduction gear.

DETAILED DESCRIPTION OF THE INVENTION

Figure 1:
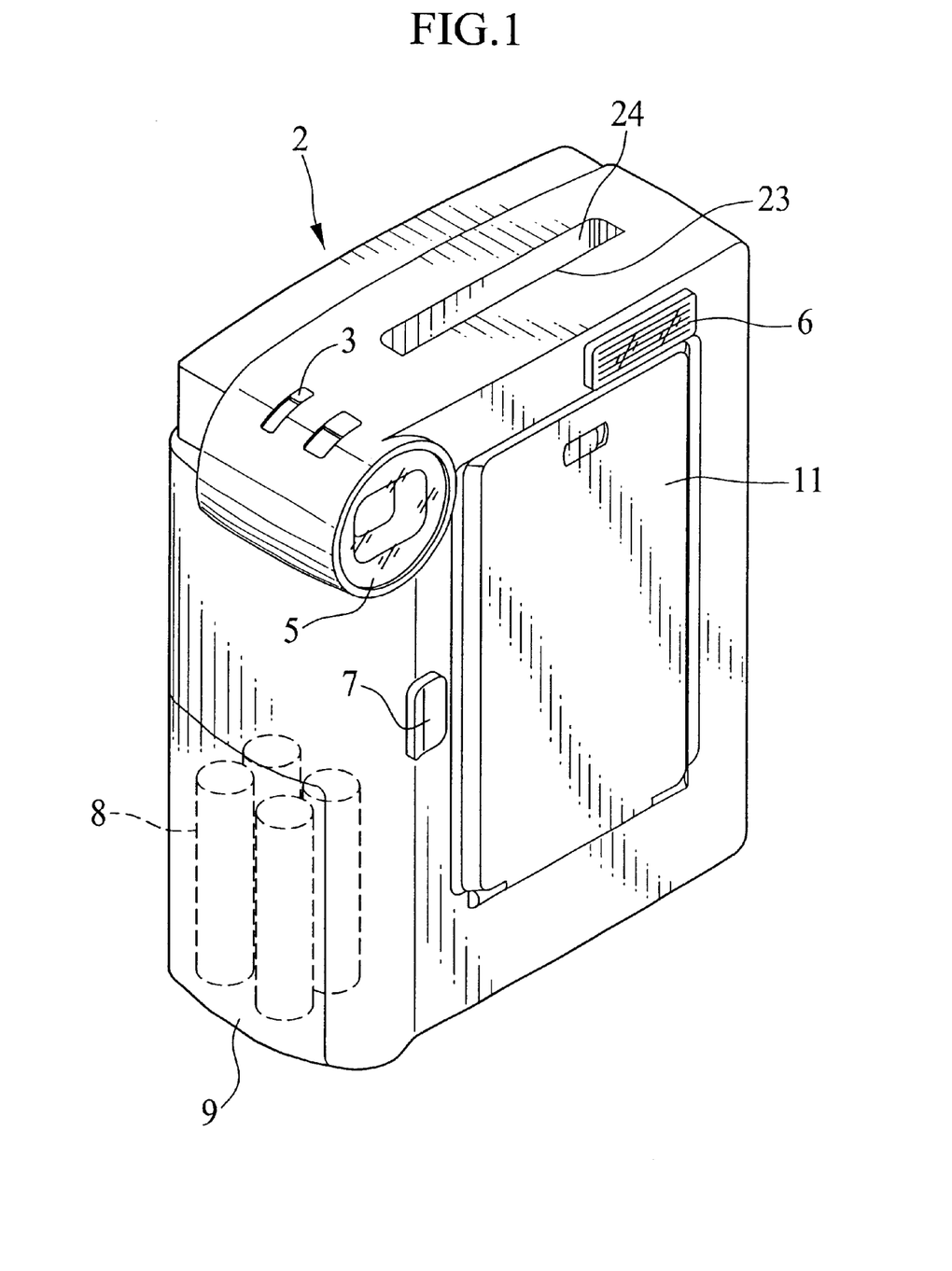
FIG. 1 is an external perspective view of an electronic still camera equipped with a printer.

FIG. 1 shows an external perspective view of a printer-equipped electronic still camera 2 (hereinafter referred to as simply camera) which is capable of printing out immediately the picture image taken by the camera on an instant film unit. A power switch 3 is on the top side of the camera 2. The camera 2 is automatically set in photographing mode upon turning on the power switch 3 and then shifted to another mode such as a reproducing mode or printing mode by switching a mode selection switch.

A taking-lens unit 5 and an electronic flash unit 6 are located at front-upper portion of the camera 2. In the back of the taking-lens unit 5, CCD (charge coupled device) is disposed. A shooting button 7 is located under the taking-lens unit 5 and an image of a subject focussed on the CCD is recorded upon depressing the shooting button 7. A flash is automatically emitted from the electronic flash unit 6 under the low brightness condition of the subject or ambient light. A battery chamber for accommodating a battery 8 is formed in the side portion of the camera 2, which is covered with a battery chamber lid 9.

Figure 2:
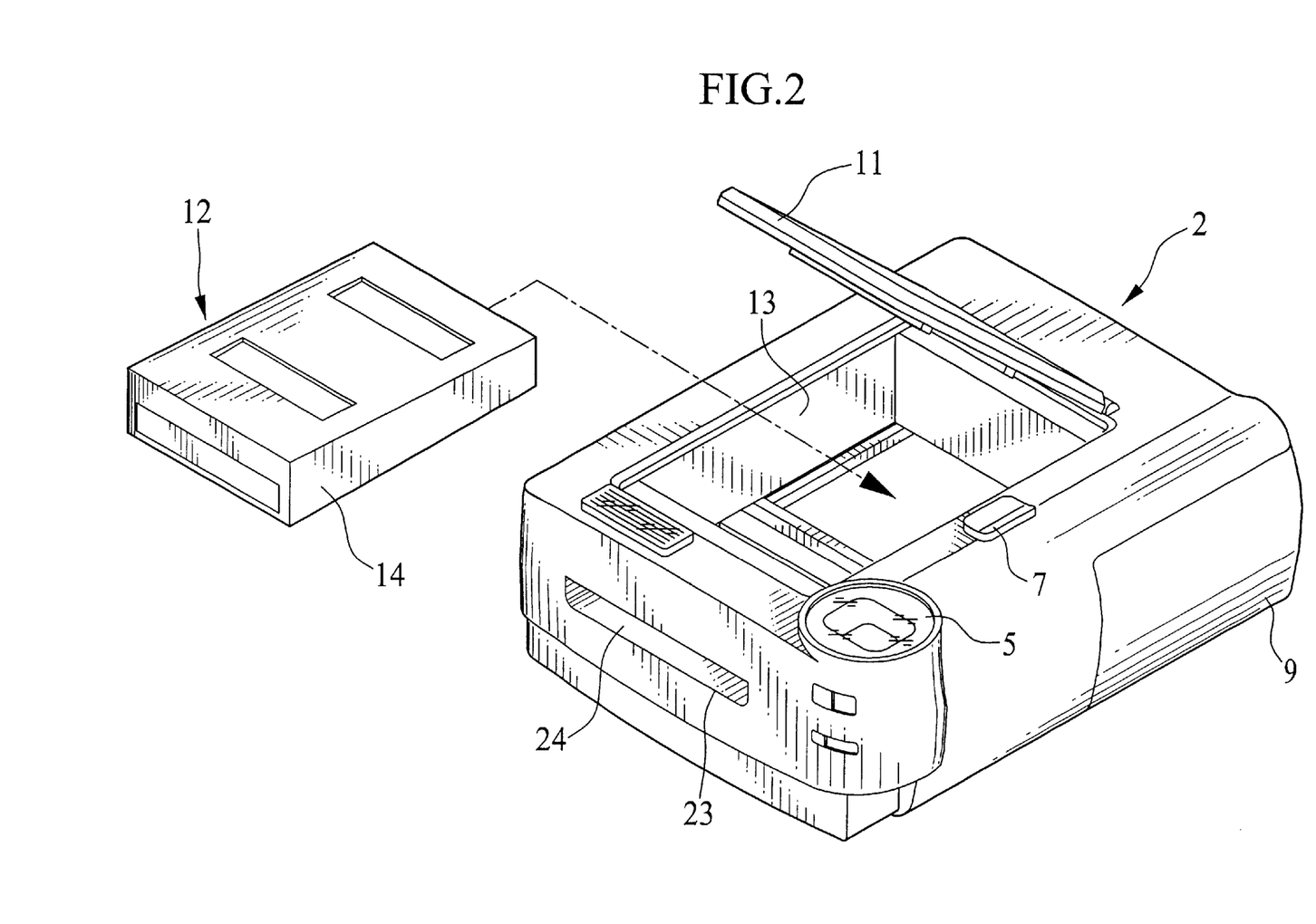
FIG. 2 is an external perspective view illustrating a film-pack loading to an electronic still camera equipped with a printer.

A film-pack chamber door 11 is installed in the middle of front side of the camera 2, inside which a film-pack chamber 13 to receive film-pack 12 is formed as shown in FIG. 2. The film-pack 12 includes a film unit plastic cartridge 14 and stacked film units therein. A printing unit for printing a picture on the film unit and a processing liquid spreading device are built in the film-pack chamber 13.

Figure 3:
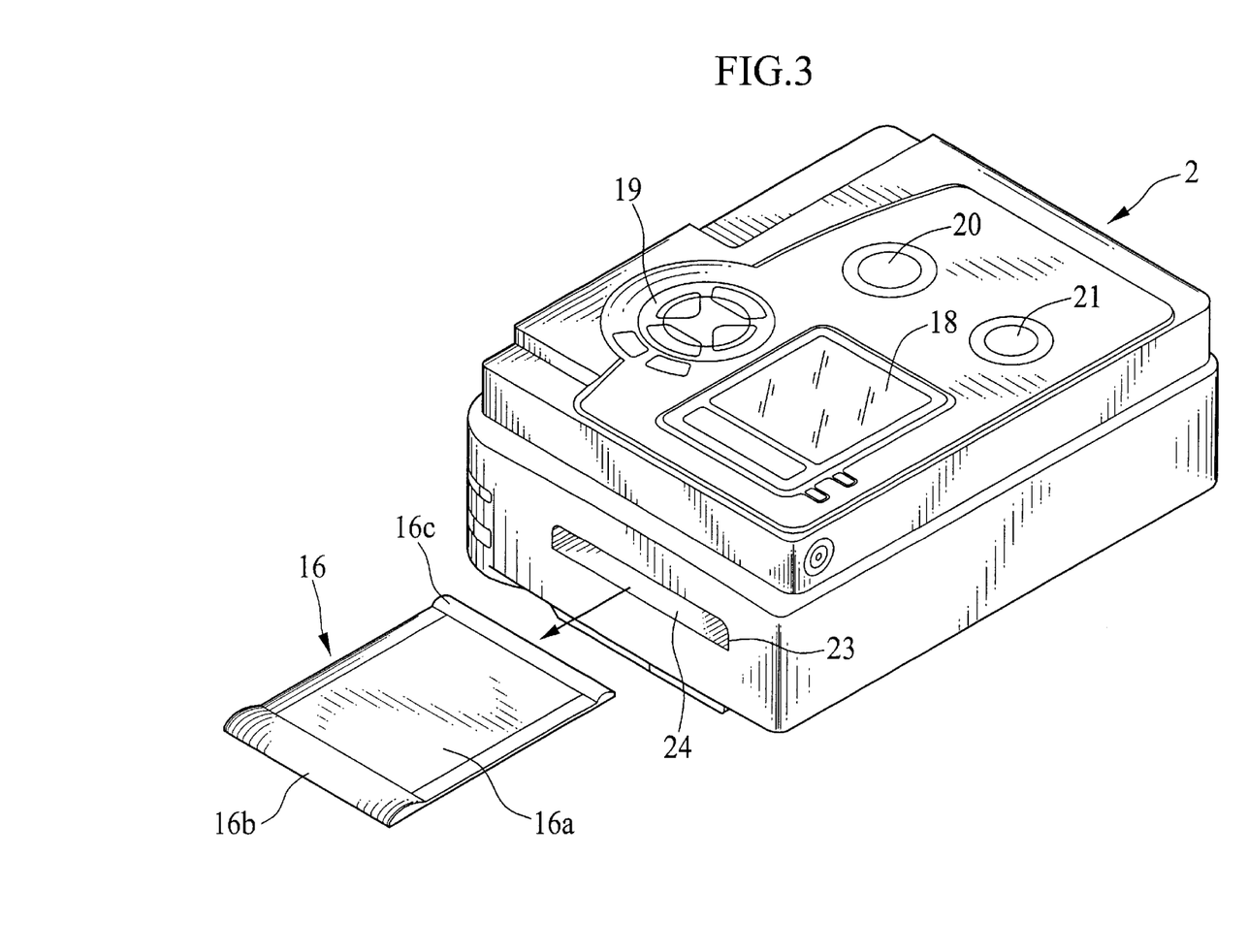
FIG. 3 is an external perspective view illustrating a printed picture emerging from an electronic still camera equipped with a printer.

As shown in FIG. 3, a film unit 16 comprises a rupturable pod portion 16b containing a processing liquid in the leading end portion of the film unit and a trap member portion 16c in the trailing end potion to catch an excess processing liquid after being spread by the pair of pressure-applying rollers, and an exposure plane 16a formed between the pod portion 16b and the trap member portion 16c. The film unit used here is a so-called transmissive type of mono-sheet that is exposed from the bottom side and later viewed from the top side.

Figure 4:
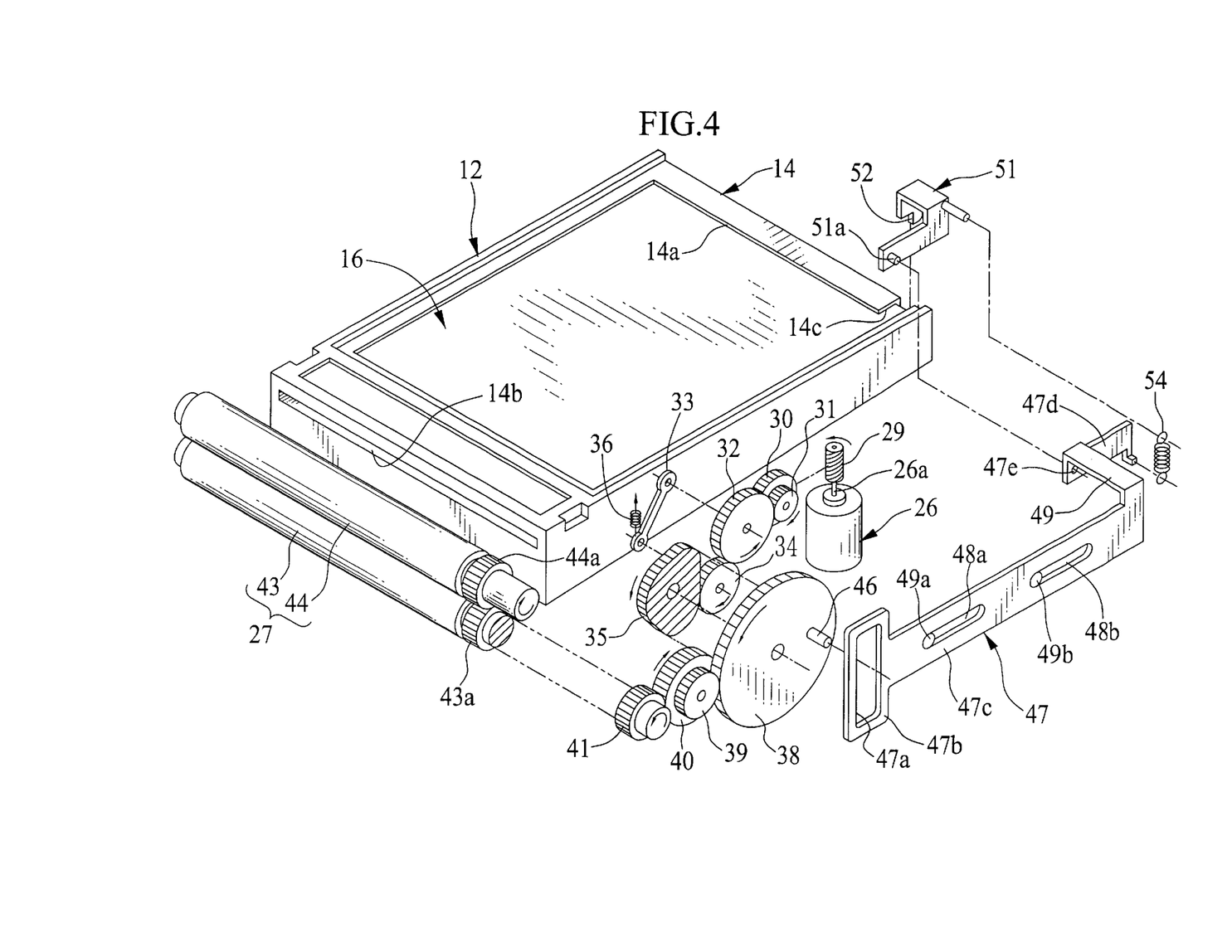
FIG. 4 is an exploded perspective view of the processing liquid spreading device of the invention.

As shown in FIG. 4, the film unit plastic cartridge 14 includes a cartridge exposure opening 14a formed on a front side thereof, a film unit exit slot 14b and an cartridge trailing end opening 14c through which a claw 52 of film unit picking device moves. The film-pack 12 is placed in the film-pack chamber 13 with its back side facing to the front side of the camera so that the cartridge exposure opening 14a can face directly to a printing unit.

The printing unit (not shown) includes a printing head and a printing head moving mechanism for moving the printing head to scan the exposure plane 16a of the film unit 16. The printing head comprises an array with numbers of transmissive type liquid crystal elements placed in a line and a white-light source to illuminate the array and a strip-shaped color filter for three primary colors, red light, green light and blue light disposed between the array and the white-light source to make a full color printing.

Usually the camera 2 is used in an upright position in photographing mode as shown in FIG. 1 and used in a position such that the front side is facing downwardly in the reproducing mode or printing mode as shown in FIG. 3. On the back of the camera is mounted a LCD (Liquid Crystal Display) panel 18, multi-operation button 19, mode selecting switch 20 and print starting button 21. The LCD panel 18 is used for monitoring a subject to be photographed like an electronic view finder and reproducing recorded image data stored in a memory. The multi-operation button 19 is used for zooming digitally, for selecting the frame for printing and for reproducing or making an operation under a variety of photographing modes in combination with using the mode selecting switch 20. Depressing the print starting button 21 starts printing the image displayed on the LCD panel 18. The layout of the buttons or switches and the monitor (LCD panel display) on the same back side of the camera makes it possible to make all necessary operations about printing while keeping the book-shaped camera in a horizontal stable position.

On the top side of the camera 2 is formed a film exit slot 23, which is normally closed with a film exit door 24 for light-shielding, through which the film unit 16 emerges from the camera 2 after being printed.

FIG. 4 is an exploded perspective view of the processing liquid spreading device of the invention. The device includes a motor 26, a pair of pressure-applying rollers 27 driven by the motor 26, a reduction gear train to transmit a rotation of an output shaft 26a of the motor 26 to the pair of pressure-applying rollers 27 by reducing the rotational speed and a picking claw mechanism to advance the film unit 16 from a film unit cartridge 14 also driven by using a movement of the reduction gear train.

A worm 29 is mounted on the output shaft 26a of the motor 26. The worm 29 is meshed with a worm wheel 30. A small gear 31 is integrally formed with the worm wheel 30. A rotation of the small gear 31 is transmitted to a gear 32. A lever 33 is rotatably mounted on the shaft of the gear 32. A driving gear 34, which meshes with the gear 32, is rotatably mounted on an opposite end portion of the lever 33. The driving gear 34 rotatably drives a driven main gear 35. The gear 34 is biased toward the main gear 35 by a spring 36 so as to mesh therewith.

Figure 5:
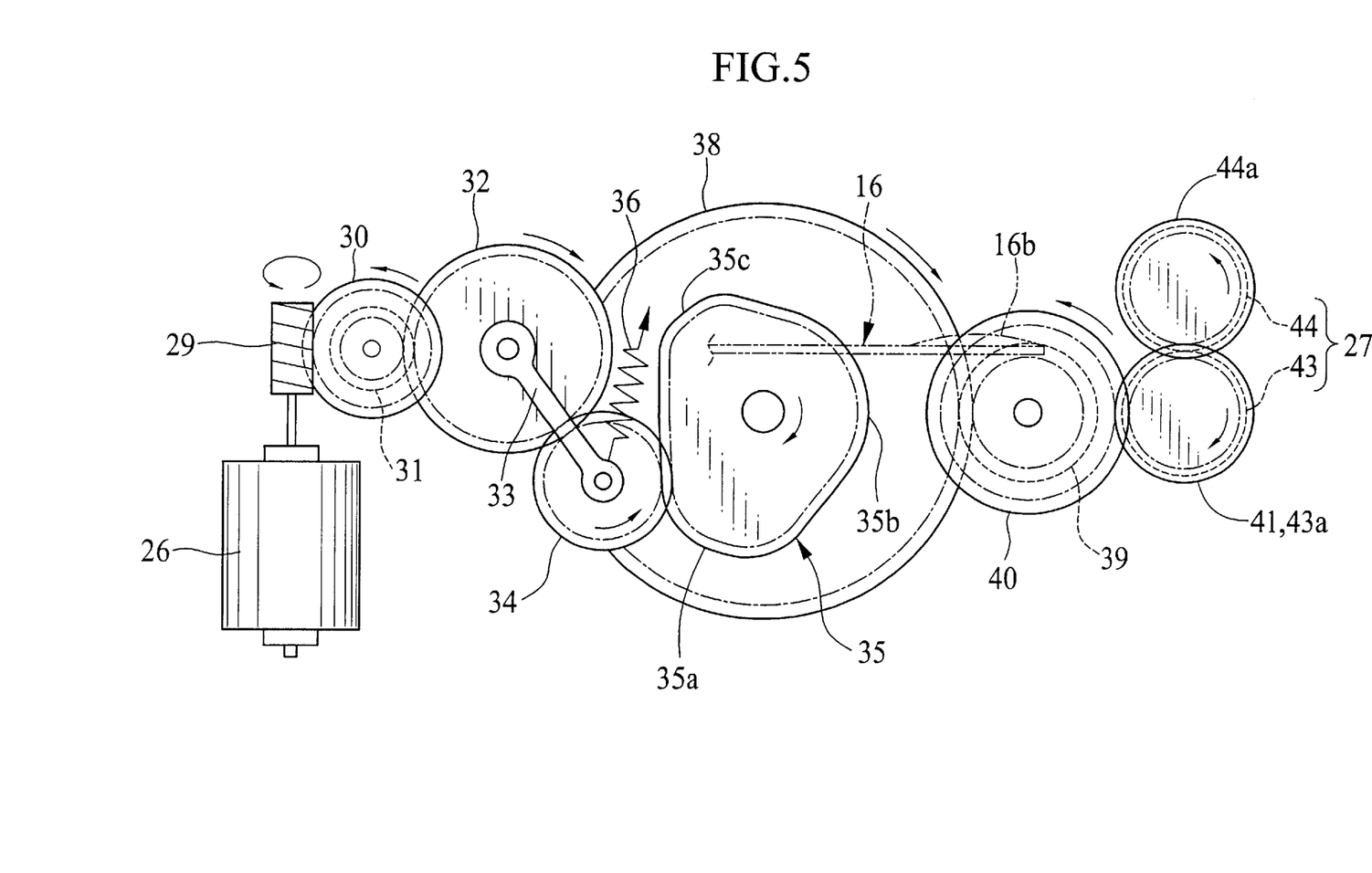
FIG. 5 is a side view illustrating the processing liquid spreading device of a first embodiment of the invention at initial stage before the film unit reaches a bite of a pair of pressure-applying rollers.

The main gear 35 is designed to make one turn to complete a film unit transportation cycle from starting to advance the film unit by picking the trailing end thereof by a picking-claw to making the trailing end of the film unit emerge from the pair of rollers by keeping advancing it by the pair of rotating rollers. As shown in FIG. 5 of a side view illustrating the processing liquid spreading device, the main gear 35 is an irregular formed gear in which a distance between the rotational axis and toothed periphery varies with (according to) the position on the periphery (along the periphery). The irregular formed gear 35 includes a first toothed sector portions 35a, a second toothed (sector-like) portion 35b and a third toothed sector portion 35c which have a different radius or distance between the rotational axis and toothed periphery from each other. Teeth of the first sector portion 35a mesh with the gear 34 when the pair of rollers 27 nips the pod portion of the film unit, teeth of the second sector (sector-like) portion 35b mesh with the gear 34 while the pair of rollers 27 nips the exposure plane 16a and teeth of the third sector portion 35c mesh when the pair of rollers 27 nips the trap member 16c.

A rotation of the gear 35 is transmitted to a gear 41 via a gear 38 which is integrally and co-axially formed with the gear 35, a gear 39 and a gear 40. The gear 41 is integrally formed with a shaft of the driving roller 43, one of the rollers 27, is rotated counterclockwise in the drawing and the other roller 44 is driven to rotate clockwise by the driving roller 43 via a gear 43a formed in the side end portion of the roller 43 and a gear 44a formed in the side end portion of the roller 44.

Figure 6:
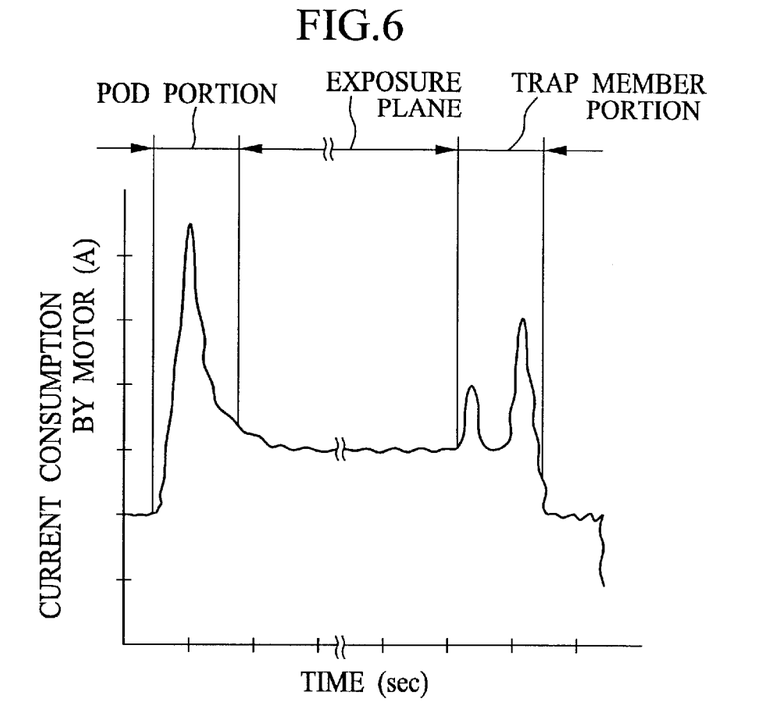
FIG. 6 is a graph showing current-consumption of motor vs time relationship for the conventional processing liquid spreading device.

FIG. 6 is a graph showing current-consumption of a motor vs a time relationship for the conventional processing liquid spreading device. The pod containing processing liquid is ruptured at the beginning of the time and the trap member is passed through the bite of the pair of rollers around the end of the time. Current-consumption by a motor steeply increases when the pod portion and the trap portion of the conventional film unit pass through the bite of the pair of rollers, because those portions are thicker than other parts of the film unit, which requires the motor to generate a larger torque to advance the thicker portion through the bite of the rollers. Thus the camera or printer using such a conventional processing liquid spreading device needs to be equipped with a large capacity battery to be able to supply a large amount of current.

Figure 7:
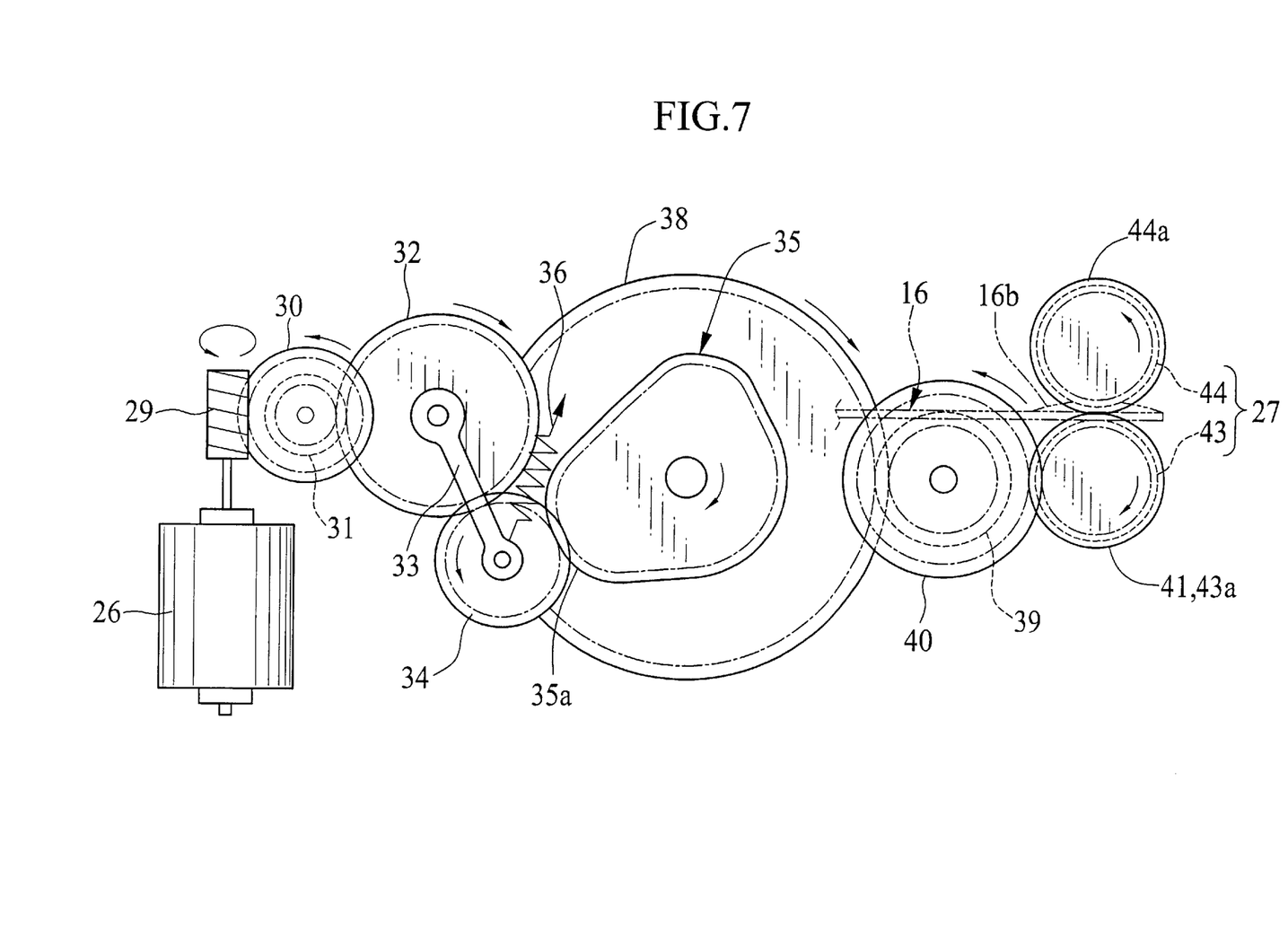
FIG. 7 is a side view illustrating the processing liquid spreading device of a first embodiment of the invention at the stage of transporting the film unit by biting the pod portion.
Figure 8:
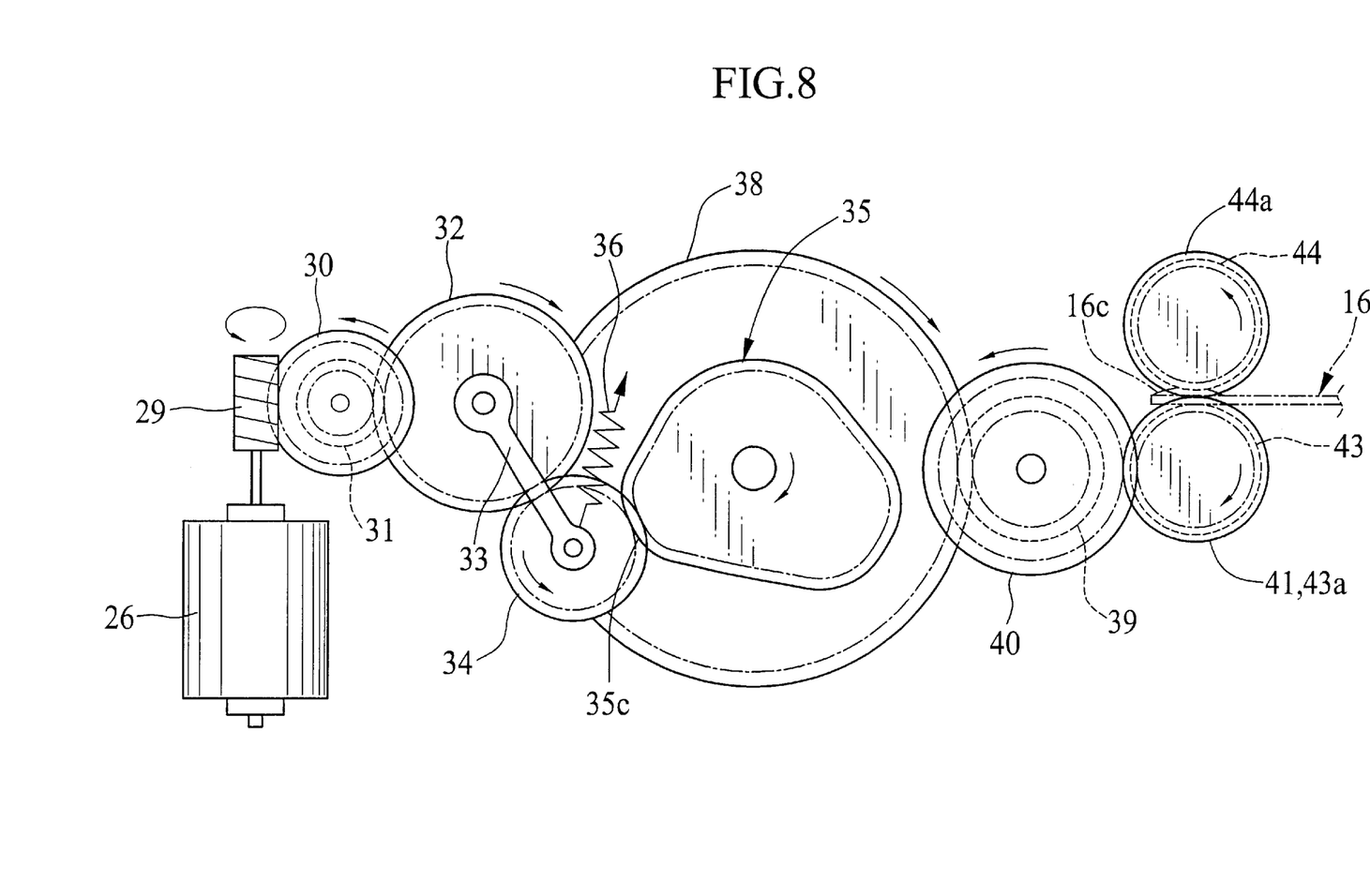
FIG. 8 is a side view illustrating the processing liquid spreading device of a first embodiment of the invention at the stage of transporting the film unit by biting the trap portion.
Figure 9:
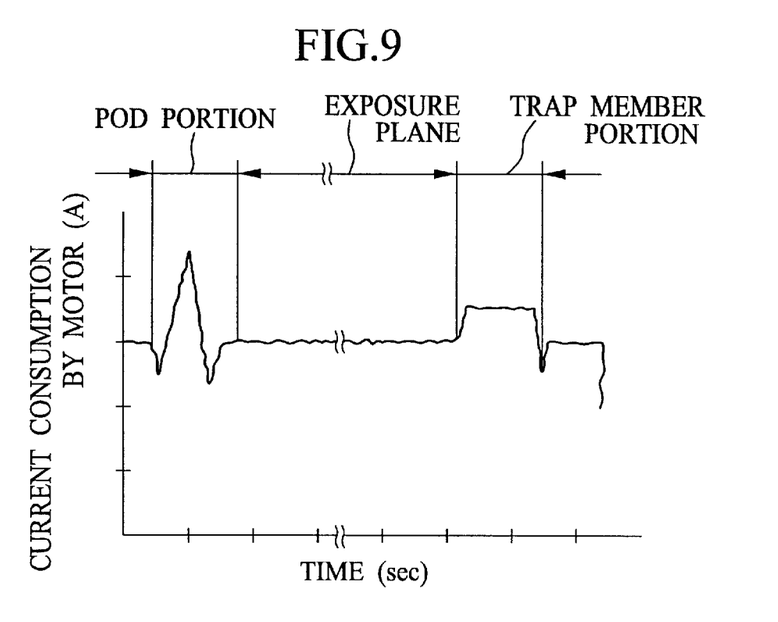
FIG. 9 is a graph showing a current-consumption of motor vs time relationship for the processing liquid spreading device of the invention.

In this embodiment of the invention, when the pod portion 16b of the film unit 16 is nipped by the pair of rollers 27, the gear 34 meshes with the teeth of the first sector portion 35a as shown in FIG. 7, and when the trap portion 16c is nipped, the gear 34 meshes with the teeth of the third sector portion 35c as shown in FIG. 8. The radiuses of both the first sector portion 35a and the third sector portion 35c are larger than that of the second (sector-like) portion 35b which relatively increases output torque of the integrally formed gear 38 to be transmitted to the pair of rollers 27. Thus the relative increase in torque of the rollers enables them to nip and advance the thicker portion of the film unit with less of an increase of torque from the power motor 26. In other words, current consumption by the motor 26 can decrease as shown in FIG. 9 compared to the conventional way as shown in FIG. 6.

The gear 38 has a link pin 46 on one side opposite to the gear 35 side, which is linked to a link plate 47. The link plate is a part of the film unit picking mechanism including a picking claw. The link plate includes a linking portion 47b where a link plate opening 47a for receiving the link pin 46 is formed, a sliding portion 47c integrally formed with the linking portion 47b and a claw base 47d for mounting a film unit picking claw thereon.

Two slots 48a, 48b are formed in the sliding portion 47c. Two regulation pins 49a, 49b which are set inside the camera 2 are received in the slots 48a, 48b respectively. The two pins enable the link plate 47 to slide along the slots. The claw base 47d which is a plate member parallel to the sliding portion 47c is integrally formed with the sliding portion via a beam plate 49. A claw lever 51 is mounted on the claw base 47d. The claw lever 51 is a U-shaped plate member of which one side has a pin 51a and the other has a claw 52. The claw 52 moves into a trailing end opening 14c of the film-pack 12 to pick an edge of the forwardmost film unit 16 and advance it through the film exit slot 14b as the link plate 47 slidably moves in the direction toward the pair of rollers 27. The claw lever 51 is swingably mounted to the claw base 47d by having the pin 51a inserted into a hole 47e formed in the claw base. A spring 54 is hooked over between the claw base 47d and the claw lever 51. The spring 54 makes the claw lever 51 slightly swing back to the initial position so that the claw 52 becomes ready to pick an edge of the next forwardmost film unit when the link plate 47 moves back to the initial set position.

In the electronic still camera equipped with a printer 2 shown in FIG. 1, turning on a power switch 3 makes the camera automatically set in the photographing mode. A user frames a subject to be taken with monitoring the displayed image on the LCD panel 18 and depresses the shooting button 7. CCD converts the image focussed thereon into an electric image signal and the signal is stored in a memory such as memory card or the like as an image data.

To print out the image data in the memory as a picture, the camera is usually held or placed horizontally as shown in FIG. 3. Then the user selects a picture displayed on the LCD panel 18 and depresses a print start key 21 to work a printing unit of the camera 2. A printing head of the printing unit scans over the exposure plane of the film unit 16 for exposing according to the selected image data stored in the memory.

After the exposure by the printing unit is complete, the motor 26 starts to rotate, the gear 38 is forced to be rotated counterclockwise thereby via the gear train 29, 30, 31, 32, 34 and 35. As a pin 46 on the gear 38 is also rotated, the pin 46 pushes an inner wall of a link late opening 47a toward the pair of rollers 27, which makes a link plate 47 slide in the direction toward the rollers along slots 48a, 48b. As the link plate slides, a claw 52 moves into a cartridge trailing end opening 14c and pushes an edge of the film unit 16 to advance it through an exit slot 14b of a film unit plastic cartridge 14.

A pod portion 16b, located on the leading end of the film unit, is discharged from the exit slot 14b and reaches a bite of the rollers 27 and is ruptured by the pressure-applying rollers 27 to discharge a contained processing liquid inside the film unit and the processing liquid is spread over while the film unit advances. To nip and transport a thicker portion of the film unit such as the pod portion by the rollers 27 places a larger load on the motor 26 because that portion is relatively thicker than the other portion, which has to make rollers move away from each other against a biasing force to provide rollers with a compression force and some other forces. As mentioned previously referring to- FIG. 6, a current-consumption by the motor surges at nipping and transporting a pod portion by the rollers in the conventional processing liquid spreading device.

In the processing liquid spreading device of the invention, however, an irregular formed gear 35 is designed and set in the device so that a first toothed sector portions 35a, which has the largest radius, is meshed with the gear 34 when the pod portion 16b at the leading end portion of the film unit 16 is nipped and transported by the rollers 27. The largest radius of the driven gear makes the largest gear ratio to produce the largest output torque of the gear 38, which enables the pod portion 16b to easily pass through the bite of the rollers with less of an increase of a torque of the motor 26. In other words, current consumed by the motor 26 can decrease as shown in FIG. 9 compared to the conventional way as shown in FIG. 6. In this situation, the rotational speed of the gear 38 relatively reduces, which causes transportation speed of the film unit to reduce, but it is not so much that the user can feel that the speed is slow or affect the development quality.

In the situation, where an exposure plane 16a, formed between the pod portion 16b and the trap member portion 16c, of the film unit 16 is nipped and advanced by the rollers 27, subsequent to passage of the pod portion, a second toothed sector portion 35b formed between the first sector portion 35a and a third sector portion 35c is meshed with the gear 34, where a radius or a distance between the rotational axis and the toothed periphery becomes smaller.

A third toothed sector portions 35c which has the second largest radius is meshed with the gear 34 when the trap member portion 16c at the trailing end portion of the film unit is nipped and transported by the rollers 27. The trap member portion 16c is slightly thinner than the pod portion 16b but still rather thicker than the exposure plane 16a of the film unit 16. The third toothed sector portions 35c enables the trap member portion 16c to easily pass through the bite of the rollers with less of an increase of a load on the motor 26. A steep increase of current consumed by the motor 26 as shown in FIG. 6 disappears as shown in FIG. 9.

In the first embodiment above-mentioned, the driving gear 34 and the driven gear 35 are spur gears. A worm and worm wheel can be used, if necessary, for example, because of the space available in the camera or the printing unit section. A second embodiment of the invention which adopts a worm and worm wheel is described below.

Figure 10:
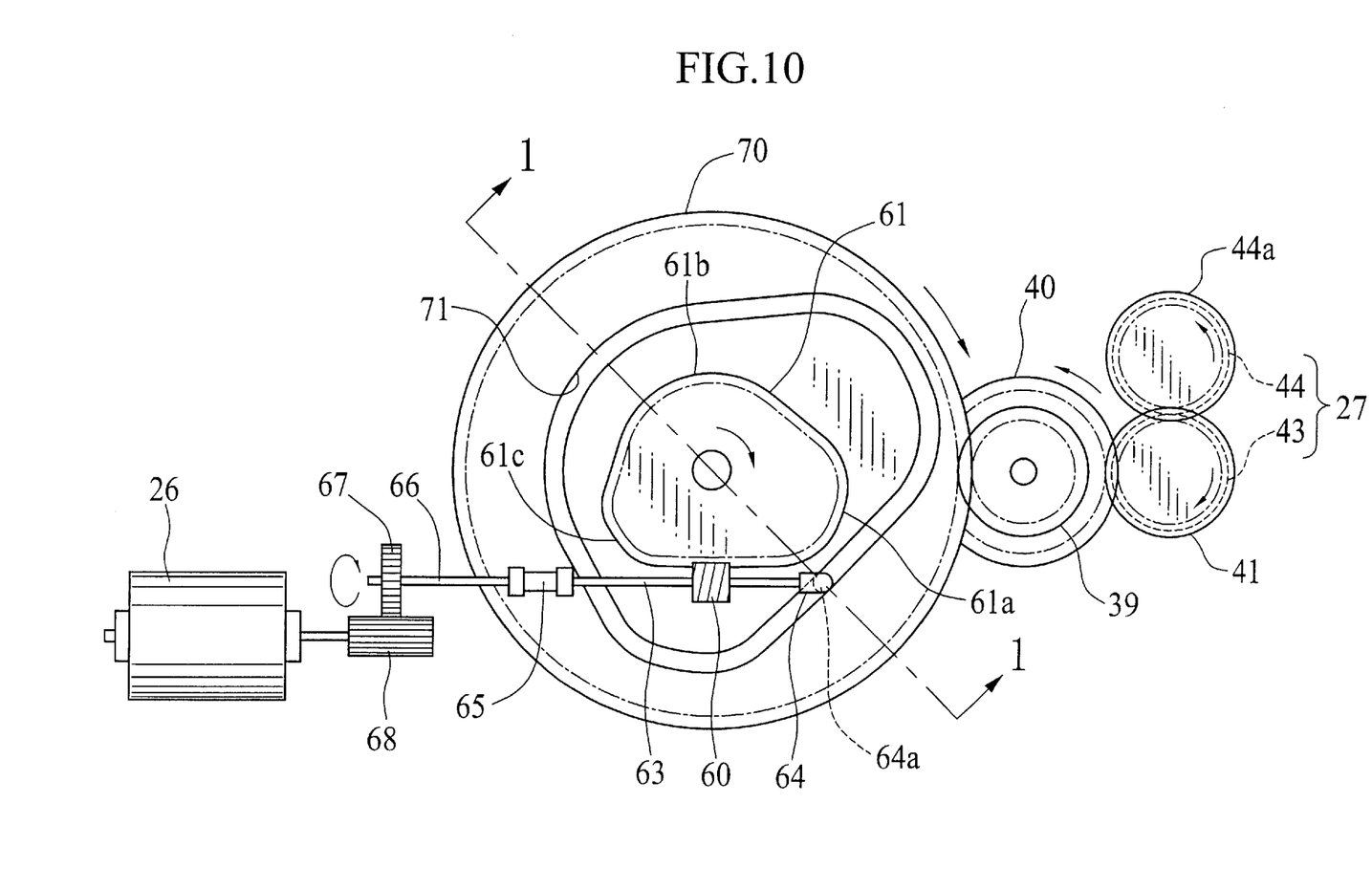
FIG. 10 is a side view illustrating the processing liquid spreading device of a second embodiment of the invention at an initial stage before the film unit reaches a bite of a pair of pressure-applying rollers.
Figure 11:
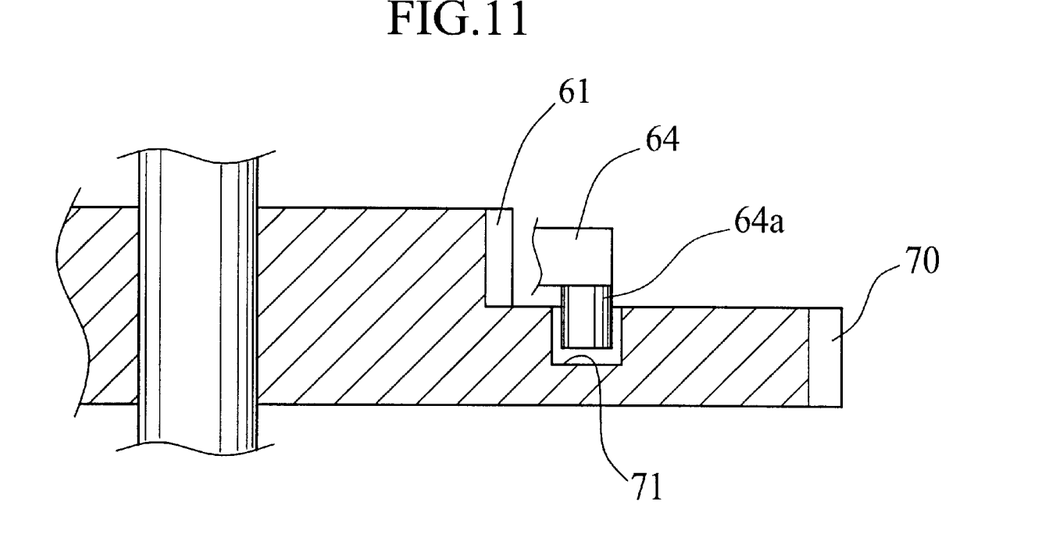
FIG. 11 is a fragmentary cross sectional view taken on the line 1—1 of FIG. 10.

FIG. 10 is a side view illustrating the processing liquid spreading device which uses a worm and a worm wheel as a driving gear and a driven gear. The worm 60 as a driving gear and the worm wheel 61 as a driven gear are installed between the pair of rollers 27, consisting of a driving roller 43 and a driven roller 44, and the motor 26. FIG. 11 is a fragmentary cross sectional view taken on the line 1—1 of FIG. 10.

The worm 60 is fixed on a rotational shaft 63. A cam follower 64 is axially fixed on the rotational shaft 63 at one end thereof. The other end of the rotational shaft 63 is swingably connected to a connecting shaft 66 via a flexible joint 65. The connecting shaft 66 has a gear 67, fixed at another end of the shaft, which meshes with a gear 68 fixed on the shaft of the motor 26.

The worm wheel 61, as the driven main gear 35 in previous embodiment, is an irregular formed gear in which the distance between the rotational axis and toothed periphery varies with the position on the periphery. The irregular formed worm wheel 61 includes a first toothed sector portion 61a, a second toothed sector portion 61b and a third toothed sector portion 61c which have a different radius or distance between the rotational axis and toothed periphery from each other, and which are integrally formed with a large gear 70. A rotation of the large gear 70 is transmitted to the paired rollers 27 via gears 39, 40. A cam groove 71 is formed on the side of the large gear 70 around the irregular formed worm wheel 61. A configuration that the cam groove 71 draws is geometrically similar to a contour of the irregular formed worm wheel 61 but is shifted in the counterclockwise direction viewing the drawing. A pin 64a fixed on the cam follower 64 is received in the cam groove 71.

In the processing liquid spreading device mentioned above, the rotation of the motor 26 is transmitted to the worm 60 via gears 68 and 67, the connecting shaft 66, the flexible joint 65 and the rotational shaft 63. The rotation of the worm is transmitted to the pair of rollers 27 via the worm wheel 61, the large gear 70 and gears 39 and 40. As the worm wheel 61 rotates, the cam groove 71 also rotates and the cam follower 64 swings to follow the groove 71. The shift in the direction of rotation between a position on the teeth of the worm wheel 61 and a corresponding position thereto in the groove 71 is equal to a shift between positions of the worm 60 and the cam follower 64 in the direction of rotation so that the worm 60 may keep meshing with the worm wheel 61.

During the period from starting to advance the film unit to making the trailing end of the film unit emerge from the pair of rollers, the worm 61 advances meshing with a first toothed sector portion 61a, a second toothed portion 61b and a third toothed sector portion 61c sequentially. Those portions have a different radius or distance between the rotational axis and toothed periphery so that a load applied to, and a current consumed by, the motor 26 may be reduced by changing a gear ratio between the worm 60 and the worm wheel 61 when the thicker parts of the film unit 16, such as the pod portion 16b or the trap member portion 16c.

In the above second embodiment, the worm 60 is guided by the cam follower 64 tracking the cam groove 71 to be able to mesh with the worm wheel 61. In the following, described is a third embodiment adopting such a cam mechanism and a spur gear instead of the worm.

Figure 12:
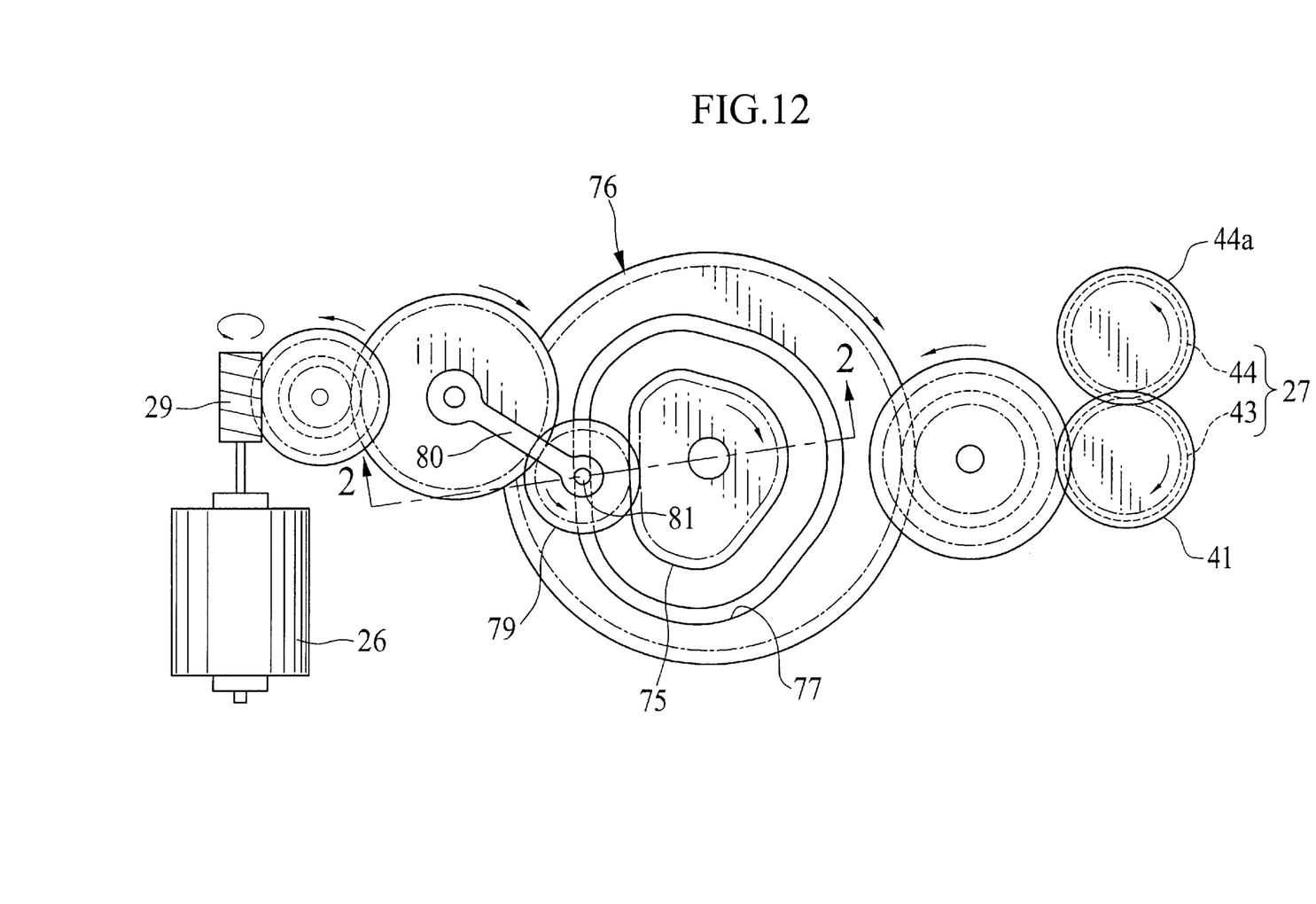
FIG. 12 is a side view illustrating the processing liquid spreading device of a third embodiment of the invention at an initial stage before the film unit reaches a bite of a pair of pressure-applying rollers.
Figure 13:
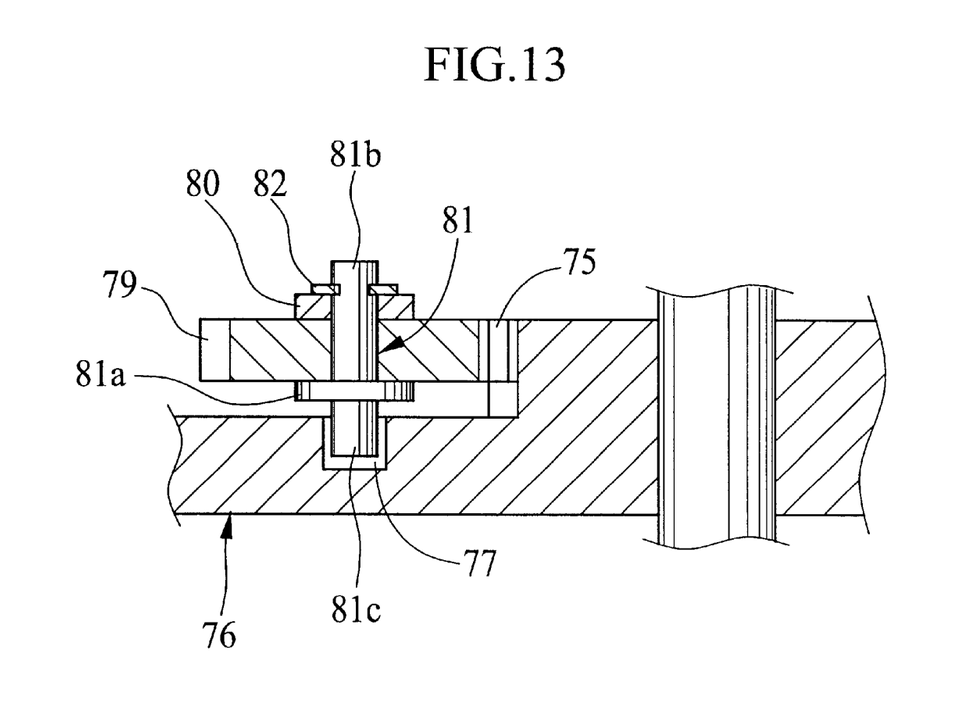
FIG. 13 is a fragmentary cross sectional view taken on the line 2—2 of FIG. 12.

FIG. 12 is a side view illustrating the processing liquid spreading device of a third embodiment of the invention which adopts a cam groove and a driving spur gear guided thereby to mesh with a driven irregular formed gear. FIG. 13 is a fragmentary cross sectional view taken on the line 2—2 of FIG. 12. An irregular formed gear 75 is integrally formed with a large gear 76. A cam groove 77 is formed on the side of the large gear 76 around the irregular formed gear 75. A configuration that the cam groove 77 draws is geometrically similar to a contour of the irregular formed gear 75. A spur gear 79 is rotatably mounted on a pin 81 which is held by a swingable lever 80. The pin 81 has an integrally formed flange 81a to bear the gear 79. One end portion 81c of the pin 81 is received in the cam groove 77 to function as a cam follower and the other end portion 81b is put through the hole formed in the swingable lever and has a snapped C-shaped retaining ring 82 adjacent to the swingable lever 80 to avoid the pin and the gear from dropping off. Thus, the driving spur gear 79 can keep meshing with the driven irregular formed gear 75.

In above three embodiments, the driving gear is spring-biased or guided by the cam groove to be able to mesh with the driven irregular formed gear. In the following fourth embodiment, a sun and planet gear mechanism is used for the same purpose.

Figure 14:
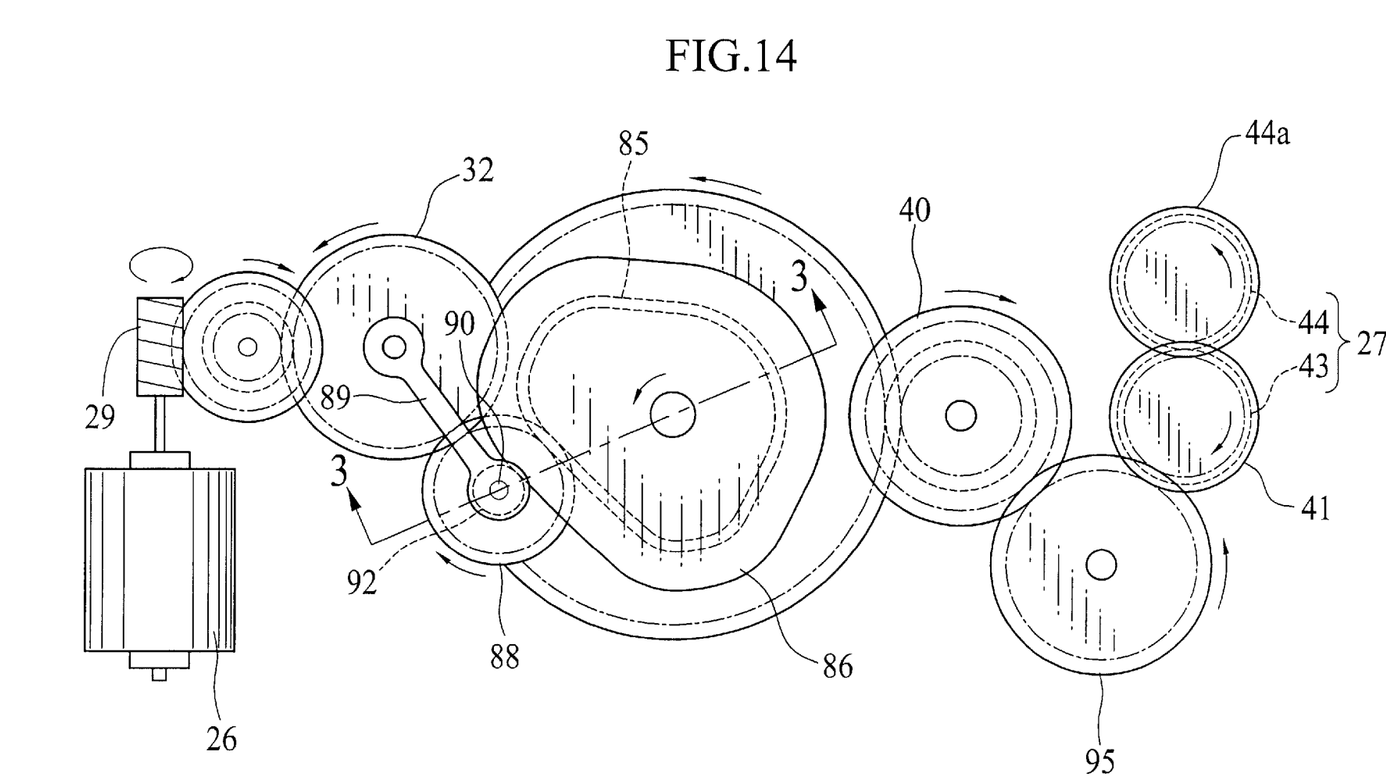
FIG. 14 is a side view illustrating the processing liquid spreading device of a fourth embodiment of the invention at an initial stage before the film unit reaches a bite of a pair of pressure-applying rollers.
Figure 15:
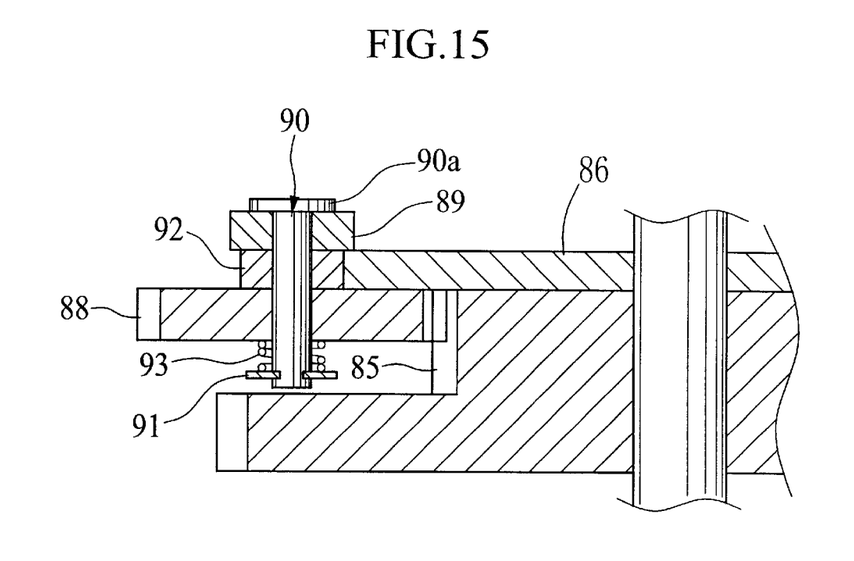
FIG. 15 is a fragmentary cross sectional view taken on the line 3—3 of FIG. 14.

FIG. 14 is a side view illustrating the processing liquid spreading device of a fourth embodiment of the invention using a sun and planet gear mechanism. FIG. 15 is a fragmentary cross sectional view taken on the line 3—3 of FIG. 14. An irregular formed gear 85 has a cam plate 86 fixed thereon by being pinned, and which has a contour that is geometrically similar to a contour of the irregular formed gear 85, but larger than the irregular formed gear 85 in size.

A driving gear 88 is rotatably mounted on a pin 90 held by a swingable lever 89. The pin 90 has an integrally formed flange 90*a* to bear the gear 88. A flange 90*a* is integrally formed on one end of the pin 90 to avoid the swingable lever 89 from dropping off and a C-shaped retaining ring 91 is snapped on the other end area. The driving gear 88 to be meshed with the driven gear 85 and a roller 92 to be contacted on the periphery (cam plane) of the cam plate 86 are rotatably mounted on the pin 90 between the flange 90*a* and the C-shaped retaining ring 91. A friction spring 93 is disposed between the C-shaped retaining ring 91 and the driving gear 88 to press against the driving gear 88 so as to provide a friction between the driving gear 88 and the swingable lever 89.

In this fourth embodiment, a rotational direction of the motor 26 is opposite to that in the previous three embodiments. To keep a rotational direction of the pair of rollers 27 being the same, an additional gear 95 is placed between the gear 40 and the gear 41. The gear 88 and a gear 32 meshing therewith constitutes a sun and planet gear mechanism. When the gear 32 (sun gear) rotates counterclockwise, the gear 88 (planet gear) rotates on its own axis clockwise and also tends to rotate around the gear 32(sun gear) counterclockwise because of friction resistance force between the driving gear 88 and the swingable lever 89 caused by the spring 93. Thus, the gear 88 can be always urged against the irregular formed gear 85 so as to mesh without using spring or cam guiding to keep meshing between the driving gear and the driven irregular formed gear as in other embodiments. The roller 92 supported by the pin 90 rolling on the cam plane of the cam plate 86 can keep gear's depth of mesh more constant.

Figure 16:
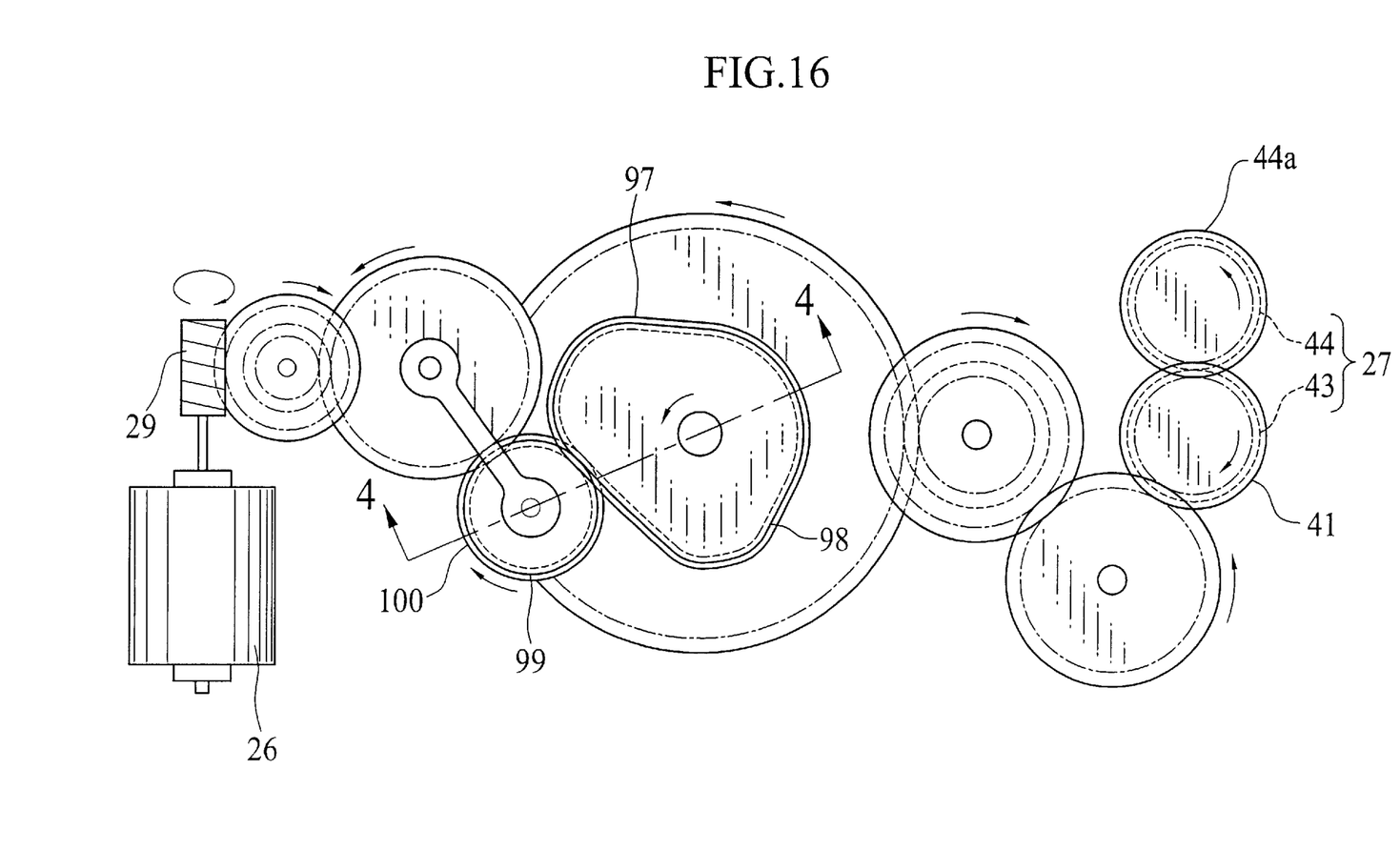
FIG. 16 is a side view illustrating the processing liquid spreading device of a fifth embodiment of the invention at an initial stage before the film unit reaches a bite of a pair of pressure-applying rollers.
Figure 17:
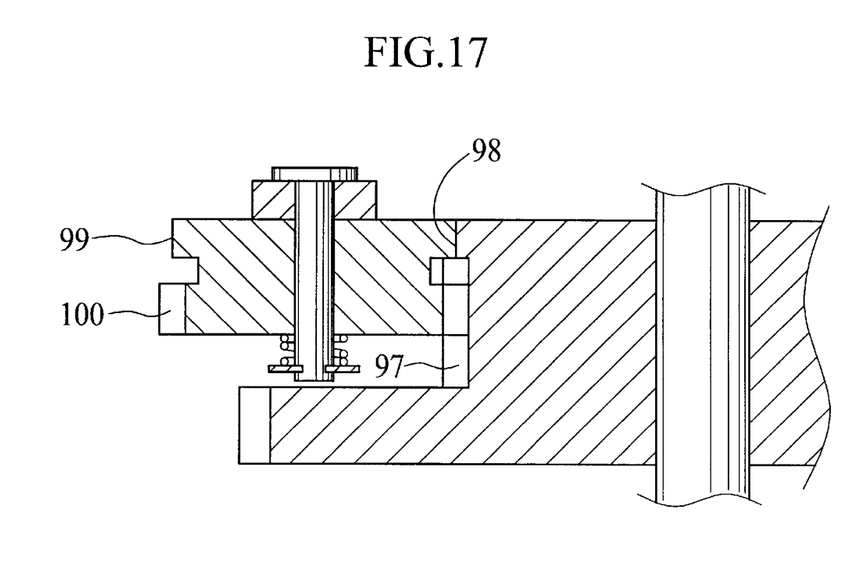
FIG. 17 is a fragmentary cross sectional view taken on the line 4—4 of FIG. 16.

In the above fourth embodiment, the similar cam plate 86 is larger than the irregular formed gear in size, which causes difference of peripheral velocity between them. However the difference is absorbed by the roller 92. In the fifth embodiment of the invention as shown in FIG. 16 and FIG. 17 which is a fragmentary cross sectional view taken on the line 4—4 of FIG. 16, the peripheral velocities of the cam plate and the irregular formed gear become the same by using a cam plate 98 of which contour is the same as pitch circle of a irregular formed gear, wherein the pitch circle is a line corresponding to pitch circle of normal gear. Therefore a disc cam follower 99 contacting on the cam plate 98 can be integrally formed with a driving gear 100 instead of using separate roller cam follower as in previous embodiment, which makes less-parts mechanism.

The processing liquid spread device of the invention can be applied not only to an electronic still camera equipped with a printer explained above but to any equipment using an instant film unit such as a conventional instant camera or a printer using an instant film unit.

In the invention, it is easy to reduce current consumption by motor, which leads to possibility of adopting a compact battery, and to improve an operation reliably only by adopting a special irregular formed gear system matched to the instant film unit without using a complicate mechanical or electrical switching mechanism to cope with load change.

What is claimed is:

1. A processing liquid spreading device for instant film unit comprising:

a pair of processing liquid spreading rollers;

a motor for driving the pair of processing liquid spreading rollers; and a reduction gear to transmit a rotation of an output shaft of the motor to the pair of processing liquid spreading rollers while reducing a rotational speed of an output shaft of the reduction gear, wherein a reduction ratio of the reduction gear varies in sequence as the film unit advances so that a load fluctuation applied to the motor can be reduced.

2. A processing liquid spreading device for instant film unit as defined in claim 1, wherein the reduction gear includes a driven gear which rotates one turn or less to complete a transportation cycle of the film unit and a driving gear to transmit the rotation of an output shaft of the motor to the driven gear.

3. A processing liquid spreading device for instant film unit as defined in claim 2, wherein the driven gear is an irregular formed gear and the driving gear is movable and biased in a direction toward a rotational axis of the driven gear to mesh therewith.

4. A processing liquid spreading device for instant film unit as defined in claim 3, wherein the irregular formed gear has a configuration that a distance between a periphery and a rotational axis of their regular formed gear varies corresponding to a thickness variation in the film unit in the advancing direction.

5. A processing liquid spreading device for instant film unit as defined in claim 4, wherein the irregular formed gear has a first sector portion and a second sector portion corresponding respectively to a leading end portion and trailing end portion of the film unit, the first sector portion includes the largest distance between the periphery and the rotational axis and the second sector portion includes the second largest distance.

6. A processing liquid spreading device for instant film unit as defined in claim 2, wherein the driving gear is moved along a direction toward the rotational axis of the driven gear by a cam integrally rotating with the driven gear so that the driving gear can be meshed therewith.

7. A processing liquid spreading device for instant film unit as defined in claim 6, wherein the cam is a cam slot formed on a side of gear which rotates integrally with the driven gear.

8. A processing liquid spreading device for instant film unit as defined in claim 6, wherein the cam is a cam plate which rotates integrally with the driven gear and the driving gear is biased using a sun and planet gear mechanism in a direction toward a rotational axis of the driven gear to mesh therewith.

9. A processing liquid spreading device for instant film unit as defined in claim 2, wherein the driven gear is a worm wheel and the driving gear is a worm.

10. A processing liquid spreading device for instant film unit as defined in claim 6, wherein the driven gear is a worm wheel and the driving gear is a worm.

11. A processing liquid spreading device for instant film unit as defined in claim 3, wherein the driving gear is a planet gear of a sun and planet gear mechanism so as to biased toward the driven gear.

12. A processing liquid spreading device for instant film unit comprising:

a pair of processing liquid spreading rollers;

a motor for driving the pair of processing liquid spreading rollers; and a reduction gear to transmit a rotation of an output shaft of the motor to the pair of processing liquid spreading rollers, the reduction gear includes a driven gear which rotates to complete a transportation cycle of the film unit and a driving gear to transmit the rotation of an output shaft of the motor to the driven gear, wherein the driven gear is an irregular formed gear and the driving gear is movable and biased in a direction toward a rotational axis of the driven gear to mesh therewith.

* * * * *